United States Patent Office 3,017,976
Patented Jan. 23, 1962

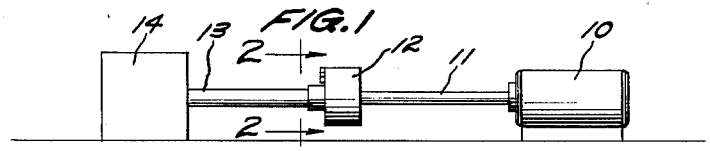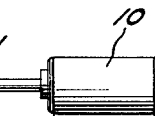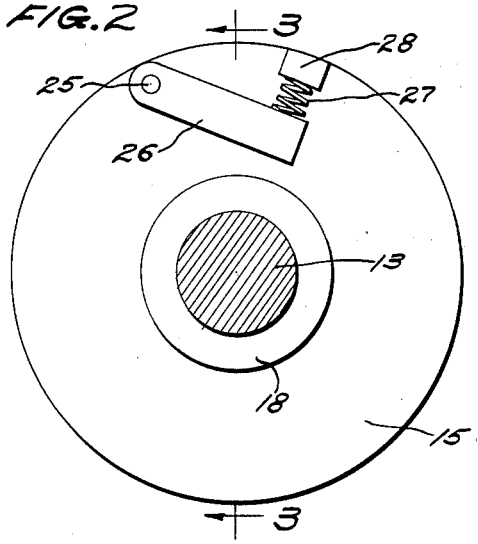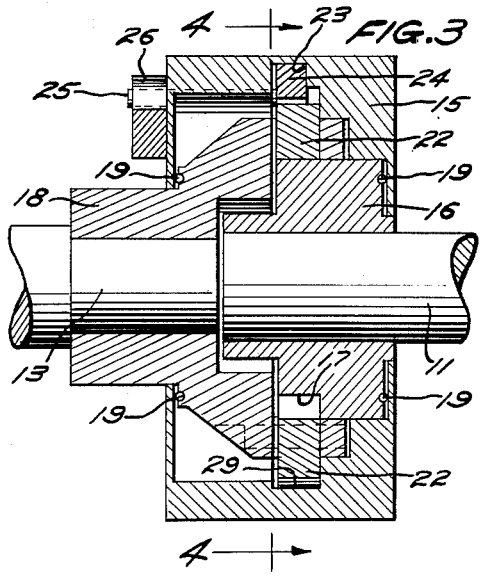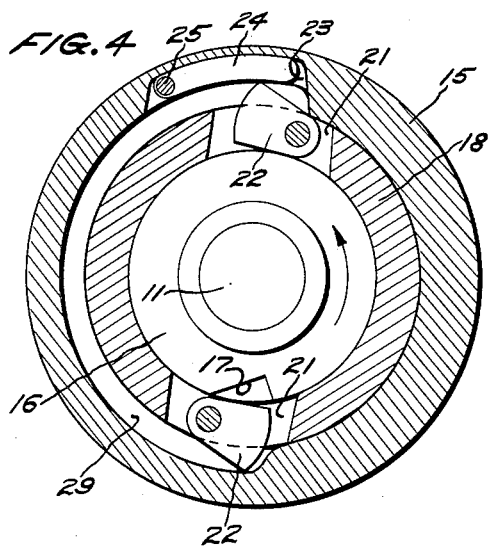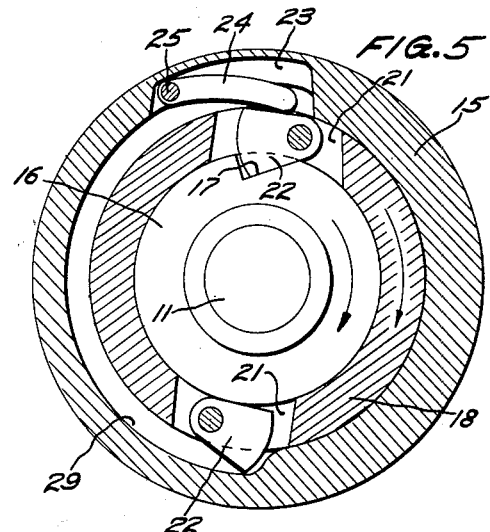

3,017,976
UNI-DIRECTIONAL CLUTCH
Leroy E. Uffman, Indianapolis, Ind., assignor to Western Electric Company, Incorporated, New York, N.Y., a corporation of New York
Filed Dec. 19, 1958, Ser. No. 781,540
2 Claims. (Cl. 192—46)

This invention relates to a uni-directional clutch and more particularly to a ratchet-type clutch adapted to intermittently transmit motion from an oscillating shaft to other driven elements.

Uni-directional clutch mechanisms previously developed have been of two major types; the wedge type and the pawl and ratchet type. The wedge-type clutch has been found to be unsatisfactory due to a failure to provide positive disengagement of cooperating members. In a similar manner, the pawl and ratchet-type clutch mechanism has failed to meet the requirements of a positive-acting uni-directional clutch mechanism since on numerous occasions the pawls fail to positively engage the ratchet, thereby resulting in undue stress on the pawl and providing the hazard of clutch slippage.

It is a prime object of this invention to provide a new and improved positive acting ratchet-type clutch.

Another object of this invention is to provide a mechanical clutch for converting oscillatory movement into intermittent rotary movement in an exceedingly simple but positive manner.

Still another object of this invention is to provide a clutch mechanism that guarantees positive engagement and disengagement of cooperating members.

A more finite object of this invention is to provide a uni-directional clutch with a driven member having a portion thereof positively confined within a driving member to preclude slippage between the driving and driven members during transmission of motion.

With these and other objects in view, the present invention contemplates a clutch mechanism comprising, among other things, a first oscillatory driving member having a V-shaped slot or notch formed in the periphery thereof for alternately receiving a pair of pawls pivotally mounted on a second member. When the driving member is rotated 180° in a counterclockwise direction, the pawls are cammed into a grooved area thereby precluding any motion being transferred to the second member. However, when the motion is reversed, the uppermost pawl is forced into the V-shaped slot and the motion of the first member is transferred to the second member resulting in a clockwise rotation of both.

Other objects and advantages of the present invention will be apparent from the following detailed description when considered in conjunction with the accompanying drawings wherein:

FIG. 1 is a view illustrating a clutch of the present invention interconnecting a motor and a driven mechanism;

FIG. 2 is a front elevational view of the clutch taken along the line 2—2 of FIG. 1;

FIG. 3 is a sectional view taken along the line 3—3 of FIG. 2 further illustrating a clutch mechanism embodying the principles of the present invention; and FIGS. 4 and 5 are views taken along line 4—4 of FIG. 3, partially in section, illustrating the clutch mechanism at different stages of operation.

Referring to FIG. 1, there is disclosed a motor 10 which imparts continuous oscillatory motion to a shaft 11. The shaft 11 in turn transfers such motion to portions of a clutch mechanism generally designated by the numeral 12. The action of the clutch mechanism translates a 180° oscillatory movement of the shaft 11 into intermittent uni-directional rotary movement in a second shaft 13. The shaft 13 in turn transmits the resulting rotary motion to a driven mechanism 14.

The elements comprising the clutch mechanism are most clearly illustrated in FIGS. 3 and 4. A housing 15 is stationarily positioned about the exterior of the moving elements comprising the clutch mechanism. The housing encloses a first hub or driving member 16 and a second hub or driven member 18. The driving member is secured for oscillatory movement with the shaft 11 and has a V-shaped slot 17 formed in the periphery thereof (FIGS. 4 and 5). The driven member 18 is secured to a shaft 13 in a similar manner. However, in this instance, movement is imparted to the shaft from the driven member. Positioned between the housing 15 and the hubs 16 and 18 are bushing members 19 which insure unrestricted movement of the hubs relative to the housing. Portions of the hub 18 and the housing are further separated by a groove 29.

Referring particularly to FIGS. 4 and 5, there is shown a pair of recessed areas 21 formed in the hub 18. A pair of pawls 22 are movably mounted on the hub 18 within the areas 21. A similar recess 23 formed in the housing 15 provides an area into which an actuator arm 24 can be moved. The actuator arm is resiliently mounted on the housing 15 by means of a pin 25 which extends through the housing and is secured to the member 26 (FIG. 2).

The resilient action of the arm 24 stems from the cooperation of the spring 27 with the member 26. The spring 27 tends to force the member 26 away from an abutment 28 which is securely mounted to the housing and bored to receive a portion of the spring. This force is imparted to the arm 24 through the member 26 and the pin 25. The actuator arm in turn tends to continuously urge the pawl 22 toward the hub 16 and out of the groove 29.

Mode of operation

A continuous oscillatory movement of the shaft 11 is transferred to the hub 16. Referring to FIG. 4, when the hub 16 moves in a counterclockwise direction, the inclined surface of the slot 17 cams the pawl 22 from within the slot into the extremity of the groove 29. The V-shaped slot is brought into position beneath the upper pawl 22 whereupon the action of the spring-biased arm 24 forces the upper pawl 22 into the V-shaped slot.

Upon movement of the hub 16 in a clockwise direction, the pawl is positioned within the slot 17 and motion is transmitted from the shaft 11 to the shaft 13. The ungrooved portion of the housing 15 holds the pawl 22 within the slot 17 until the pawl is again positioned in alignment with the lower extremity of the groove 29. The camming function performed by the ungrooved portion of the housing insures positive confinement of the pawl 22 within the slot 17 and precludes slippage between the driving and driven members. Upon subsequent reversal in the direction of movement of the shaft 11, the inclined surface of the slot will again cam the pawl into the groove in anticipation of another cycle of operation.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a clutch mechanism for translating oscillatory motion to intermittent rotary movement, a rotatable driving member having notch means therein, a driven member rotatable coaxially with said driving member and having pawl means thereon cooperable with said notch means, said driving member being oscillatory through a prescribed angle of rotation to drive said driven member intermittently in one direction through said notch means and said pawl means, and a fixed cam member extending along the path of travel of said notch means for holding said pawl means firmly within said notch means substantially throughout the common movement of said driving and driven members.

2. In a clutch mechanism for translating oscillatory motion to intermittent rotary movement, a rotatable driving member having a notch therein, a driven member rotatable coaxially with said driving member and having two pawls thereon alternately cooperable with said notch, said driving member being oscillatory through an angle of rotation of substantially 180° to drive said driven member intermittently in one direction through said notch and successive ones of said pawls, and a fixed cam member extending along the path of travel of said notch means for holding successive ones of said pawls firmly within said notch substantially throughout the common movement of said driving and driven members.

References Cited in the file of this patent

UNITED STATES PATENTS

| | | |
|---|---|---|
| 677,592 | Patrick | July 2, 1901 |
| 756,086 | Weiler | Mar. 29, 1904 |
| 1,025,043 | Allen | Apr. 30, 1912 |
| 1,801,359 | Metcalfe | Apr. 21, 1931 |
| 2,463,536 | Hitt | Mar. 8, 1949 |